UNITED STATES PATENT OFFICE.

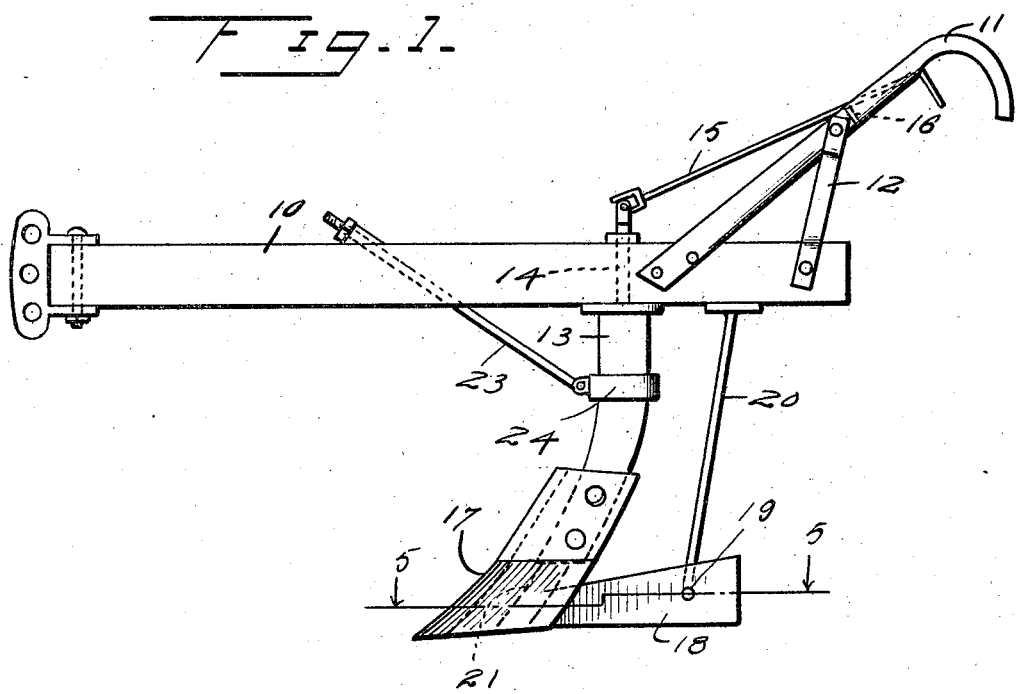
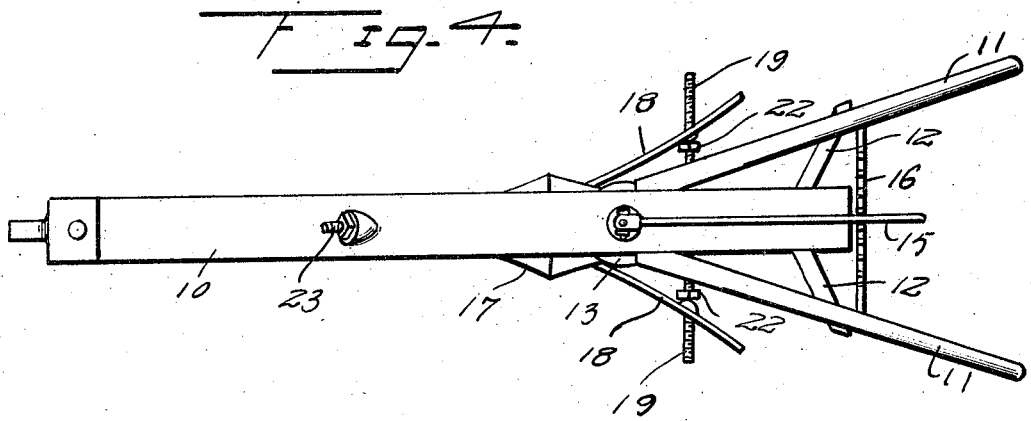

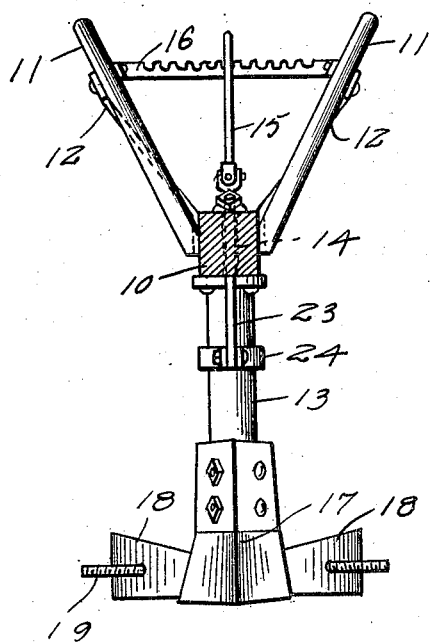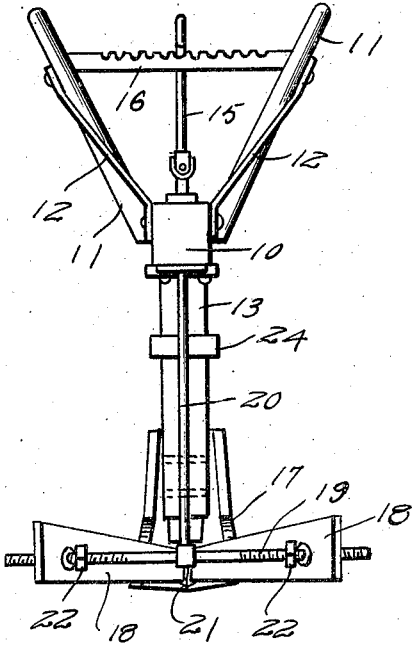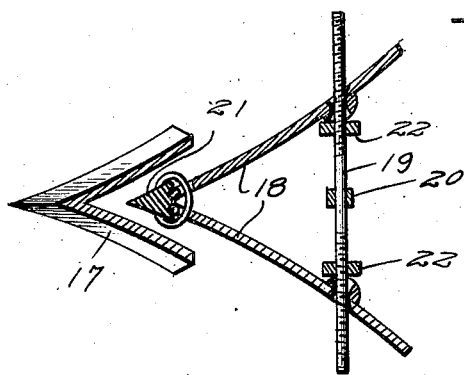

PAUL HENDEL, OF HIGH RIDGE, MISSOURI.

TURNING SHOVEL-PLOW.

1,401,779.  Specification of Letters Patent.  Patented Dec. 27, 1921.

Application filed August 19, 1920. Serial No. 404,510.

*To all whom it may concern:*

Be it known that I, PAUL HENDEL, a citizen of the United States, residing at High Ridge, in the county of Jefferson and State of Missouri, have invented certain new and useful Improvements in Turning Shovel-Plows; and I do hereby declare the following to be a full, clear, and exact description of the invention, such as will enable others skilled in the art to which it appertains to make and use the same.

The object of the invention is to provide a relatively simple turning shovel plow whereby the soil may be turned either to one side or the other or may be divided so that the device can be used as a furrow burster at the option of the operator and through the agency of means which may be adjusted at any time during the use of the apparatus and without special manipulation or the use of tools or the like, and with this object in view the invention consists in a construction and combination of parts of any preferred embodiment as shown in the accompanying drawings, wherein:

Figure 1 is a side view of a plow embodying the invention.

Fig. 2 is a front view of the same.

Fig. 3 is a rear view.

Fig. 4 is a plan view.

Fig. 5 is a horizontal section on the plane indicated by the line 5—5 of Fig. 1.

Connected with the beam 10 which may be of the ordinary or any preferred construction are the usual handles 11 connected at intermediate points with the beam by means of braces 12 or the equivalent thereof, and revolubly mounted upon the beam is a standard 13 having a spindle 14 with which is connected an adjusting lever 15 for engagement with a transverse rack 16 spanning the interval between and also serving as a transverse brace for the handles 11, and serving by engagement with the lever to lock the standard in its adjusted position.

The standard carries a plow share 17 of any preferred construction adapted to operate either to the right or left or to serve as a means of splitting a furrow when the apparatus is to be used as a furrow burster, and located in rear of the plow share and in rearwardly divergent relation with each other are the wings 18 connected by the transverse threaded brace 19 with an intermediate portion of which is connected a hanger 20 depending from the plow beam. The wings are connected at their forward adjacent ends with a shoe 21 with relation to which the rearward divergence of the wings may be adjusted by means of the bolts 19 upon which are threaded nuts 22 for contact with the wings, and extending forwardly from the standard 13 and secured at its forward upper end to the plow beam is a brace 23 having a ring bearing 24 embracing the standard to permit of the rotary adjustment of the latter therein by the manipulation of the operating lever 15.

It will be seen that the plow share by means of the standard may be turned to throw the soil to either side of the path of the plow or may be arranged in a forward direction to split the furrow, the displaced soil being engaged and positioned by the rearwardly divergent wings 18, to cause a spreading action to any desired extent dependent upon the adjustment of said wings, and that the adjustment of the plow share may be effected by the operator without checking the forward movement of the plow or interferring with the operation thereof.

Having thus described the invention, what I claim is:—

1. A plow having a beam, and a plow member supported therefrom, a hanger depending from the beam, a rod mounted transversely of the hanger, wings for coöperation with the plow share having openings through which the rods extend, and means on the rod coöperating with the wings to vary their position relatively to the mold board of the plow member.

2. A plow having a beam, a plow member having a standard extending rigidly therefrom, a bearing below the beam in which the standard is journaled, a diagonal rod extending from the beam mounting the bearing, a spindle on the standard journaled in the beam, handle bars in spaced relation rising from the beam, a toothed bar spanning said handle bars, an actuating member for the spindle to coöperate with the toothed bar, a hanger depending from the beam, a rod mounted transversely of the hanger, wings for coöperation with the plow member having openings through which the rod extends, said rod having screw threads, and nuts on the rods coöperating with the interior walls of the wings to vary the position of the wings relatively to the mold board of the plow member.

In testimony whereof I affix my signature in presence of two witnesses.

PAUL HENDEL.

Witnesses:
 JOSEPH HANNA,
 ZACHARY T. TIDD.